(12) United States Patent
Sham

(10) Patent No.: US 9,955,115 B2
(45) Date of Patent: Apr. 24, 2018

(54) FACILITATING WIDE VIEW VIDEO CONFERENCING THROUGH A DRONE NETWORK

(71) Applicant: Wellen Sham, Taipei (TW)

(72) Inventor: Wellen Sham, Taipei (TW)

(73) Assignee: Wellen Sham, Taipei (TW)

( * ) Notice: Subject to any disclaimer, the term of this patent is extended or adjusted under 35 U.S.C. 154(b) by 0 days.

(21) Appl. No.: 15/341,813

(22) Filed: Nov. 2, 2016

(65) Prior Publication Data

US 2017/0195627 A1     Jul. 6, 2017

Related U.S. Application Data

(60) Provisional application No. 62/274,112, filed on Dec. 31, 2015.

(51) Int. Cl.
| | |
|---|---|
| *H04N 7/15* | (2006.01) |
| *H04N 7/14* | (2006.01) |
| *H04B 7/185* | (2006.01) |
| *H04N 5/232* | (2006.01) |
| *B64C 39/02* | (2006.01) |

(Continued)

(52) U.S. Cl.
CPC ........... *H04N 7/147* (2013.01); *B64C 39/024* (2013.01); *B64D 47/08* (2013.01); *G05D 1/0094* (2013.01); *H04B 7/18506* (2013.01); *H04N 5/23238* (2013.01); *H04N 7/15* (2013.01); *B64C 2201/127* (2013.01); *B64C 2201/146* (2013.01)

(58) Field of Classification Search
CPC ............ H04N 7/14; H04N 7/142; H04N 7/15; H04N 7/152

USPC .................... 348/14.01–14.16, 47, 46; 701/2
See application file for complete search history.

(56) References Cited

U.S. PATENT DOCUMENTS

| | | |
|---|---|---|
| 6,958,676 B1 | 10/2005 | Morgan et al. |
| 7,885,548 B1 | 2/2011 | Nelson et al. |
| 8,503,941 B2 | 8/2013 | Erdos et al. |

(Continued)

FOREIGN PATENT DOCUMENTS

WO     2010/089738 A2     8/2010

OTHER PUBLICATIONS

U.S. Appl. No. 15/341,809, filed Nov. 2, 2016, Notice of Allowance dated Jun. 16, 2017, all pages.

(Continued)

*Primary Examiner* — Melur Ramakrishnaiah
(74) *Attorney, Agent, or Firm* — Kilpatrick Townsend & Stockton LLP

(57) ABSTRACT

Embodiments are provided for facilitating a wide-view video conference through a UAV network. For facilitating the wide-view video conference, UAVs can be employed to capture and transmit video data at locations of parties involved in the wide-view video conference. One or more UAVs in the UAV network can be instructed to locate the party's location and zoom-in onto the party's location. In some examples, the UAV(s) can be equipped with a 360 degree video camera such that a wide-area covered by the 360 degree video can be captured. The video data can be transmitted to a video data processing center in real-time or substantially in real-time. The video data transmission by the given UAV to the video data processing center can be through a UAV network. The video stream can be output at a location of a given party in the video conference.

8 Claims, 7 Drawing Sheets

(51) Int. Cl.
  *B64D 47/08* (2006.01)
  *G05D 1/00* (2006.01)

(56) References Cited

U.S. PATENT DOCUMENTS

| | | |
|---|---|---|
| 8,527,146 B1 | 9/2013 | Jackson et al. |
| 8,717,436 B2 | 5/2014 | Heminghous et al. |
| 8,970,694 B2 | 3/2015 | Dunkel et al. |
| 9,022,324 B1 | 5/2015 | Abhyanker |
| 9,056,676 B1 | 6/2015 | Wang |
| 9,070,289 B2 | 6/2015 | Saund et al. |
| 9,148,215 B1 | 9/2015 | Bonawitz |
| 9,170,117 B1 | 10/2015 | Abuelsaad et al. |
| 9,313,242 B2 | 4/2016 | Mann et al. |
| 9,313,667 B1 | 4/2016 | Daoura |
| 9,466,161 B2 | 10/2016 | Ricci |
| 9,489,839 B2 | 11/2016 | Nerayoff et al. |
| 9,590,298 B1 | 3/2017 | Buchmueller et al. |
| 9,786,165 B2 | 10/2017 | Sham |
| 9,826,256 B2 | 11/2017 | Sham |
| 2003/0200398 A1 | 10/2003 | Harris |
| 2007/0080813 A1 | 4/2007 | Melvin |
| 2007/0250260 A1 | 10/2007 | Ariyur et al. |
| 2008/0018730 A1 | 1/2008 | Roth |
| 2008/0249857 A1 | 10/2008 | Angell et al. |
| 2010/0031284 A1 | 2/2010 | Miyaki |
| 2010/0036717 A1 | 2/2010 | Trest |
| 2010/0085236 A1 | 4/2010 | Franceschini et al. |
| 2010/0179878 A1 | 7/2010 | Dawson et al. |
| 2010/0293033 A1 | 11/2010 | Hall et al. |
| 2011/0292160 A1* | 12/2011 | Shitrit ............... G06F 17/30899 348/14.02 |
| 2012/0054028 A1 | 3/2012 | Tengler et al. |
| 2012/0089462 A1 | 4/2012 | Hot |
| 2012/0122418 A1* | 5/2012 | Hicks, III ............ G08B 25/001 455/404.1 |
| 2013/0210461 A1 | 8/2013 | Moldavsky et al. |
| 2013/0273839 A1 | 10/2013 | Breshears |
| 2013/0317680 A1 | 11/2013 | Yamamura et al. |
| 2013/0328997 A1* | 12/2013 | Desai ..................... H04N 7/141 348/14.02 |
| 2014/0241239 A1 | 8/2014 | Chang |
| 2014/0309806 A1 | 10/2014 | Ricci |
| 2014/0336848 A1* | 11/2014 | Saund .................... G08G 1/054 701/3 |
| 2014/0344062 A1 | 11/2014 | LaMont |
| 2015/0049192 A1 | 2/2015 | Hooton |
| 2015/0062339 A1 | 3/2015 | Ostrom |
| 2015/0070516 A1 | 3/2015 | Shoemake et al. |
| 2015/0092020 A1* | 4/2015 | Vaughn ............. H04N 13/0203 348/47 |
| 2015/0127460 A1 | 5/2015 | Daub et al. |
| 2015/0134143 A1* | 5/2015 | Willenborg .......... G05D 1/0094 701/2 |
| 2015/0140954 A1 | 5/2015 | Maier et al. |
| 2015/0146579 A1 | 5/2015 | Teller et al. |
| 2015/0204974 A1 | 7/2015 | Pillay |
| 2015/0257081 A1 | 9/2015 | Ramanujan et al. |
| 2015/0280810 A1 | 10/2015 | Beals et al. |
| 2015/0325268 A1 | 11/2015 | Berger et al. |
| 2016/0019458 A1 | 1/2016 | Kaufhold |
| 2016/0078759 A1 | 3/2016 | Nerayoff et al. |
| 2016/0116291 A1 | 4/2016 | Chien |
| 2016/0199034 A1 | 7/2016 | Labyed et al. |
| 2016/0271796 A1 | 9/2016 | Babu |
| 2016/0272196 A1 | 9/2016 | Hocking et al. |
| 2016/0285864 A1 | 9/2016 | Canavor et al. |
| 2016/0363929 A1 | 12/2016 | Clark et al. |
| 2017/0039424 A1 | 2/2017 | Nerayoff et al. |
| 2017/0041763 A1 | 2/2017 | Jalali |
| 2017/0353229 A1 | 12/2017 | Sham |

OTHER PUBLICATIONS

U.S. Appl. No. 15/341,797, filed Nov. 2, 2016, Non-Final Rejection dated Jan. 27, 2017, all pages.
U.S. Appl. No. 15/341,797, filed Nov. 2, 2016, Final Rejection dated May 10, 2017, all pages.
U.S. Appl. No. 15/341,809, filed Nov. 2, 2016, Non-Final Rejection dated Dec. 30, 2016, all pages.
U.S. Appl. No. 15/341,818, filed Nov. 2, 2016, Non-Final Rejection dated Jan. 27, 2017, all pages.
U.S. Appl. No. 15/341,824, filed Nov. 2, 2016, Non-Final Rejection dated Mar. 16, 2017, all pages.
U.S. Appl. No. 15/341,831, filed Nov. 2, 2016, Non-Final Rejection dated Jan. 13, 2017, all pages.
European Search Report for EP 16 20 6286 dated May 24, 2017, 7 pages.
European Search Report for EP 16 20 6298 dated May 24, 2017, 7 pages.
European Search Report for EP 16 20 6328 dated May 29, 2017, 6 pages.
European Search Report for EP 16 20 6338 dated Jun. 6, 2017, 6 pages.
European Search Report for EP 16 20 6345 dated May 29, 2017, 8 pages.
U.S. Appl. No. 15/341,831, filed Nov. 2, 2016, Notice of Allowance dated May 23, 2017, all pages.
U.S. Appl. No. 15/341,797, filed Nov. 2, 2016, Non-Final Rejection dated Dec. 14, 2017, all pages.

* cited by examiner

FACILITATING WIDE VIEW VIDEO CONFERENCING THROUGH A DRONE NETWORK

CROSS-REFERENCE TO RELATED APPLICATIONS

The present application claims priority to U.S. Provisional Patent Application No. 62/274,112, filed on Dec. 31, 2015, the disclosure of which is hereby incorporated by reference in its entirety for all purposes.

The present application is related to the following co-pending U.S. Nonprovisional Patent Applications: U.S. Nonprovisional application Ser. No. 15/341,809, filed Nov. 2, 2016, now U.S. Pat. No. 9,800,321, issued Oct. 24, 2017; U.S. Nonprovisional application Ser. No. 15/341,818, filed Nov. 2, 2016; U.S. Nonprovisional application Ser. No. 15/341,824, filed Nov. 2, 2016, now U.S. Pat. No. 9,826,256, issued Nov. 21, 2017; and U.S. Nonprovisional application Ser. No. 15/341,831, filed Nov. 2, 2016, now U.S. Pat. No. 9,786,165, issued Oct. 10, 2017. The entire disclosures of each of these applications are hereby incorporated by reference in their entireties for all purposes.

BACKGROUND

The present disclosure relates to facilitating video conferencing through unmanned aerial vehicle, and more specifically to facilitating wide-view video conferencing through self-sustaining unmanned aerial vehicle.

An unmanned aerial vehicle (UAV), commonly known as a drone and also referred by several other names, is an aircraft without a human pilot aboard. The flight of UAVs may be controlled either autonomously by onboard computers or by the remote control of a pilot on the ground or in another vehicle. UAVs have mostly found military and special operation applications, but also are increasingly finding uses in civil applications, such as policing, surveillance and firefighting, and nonmilitary security work, such as inspection of power or pipelines. UAVs are adept at gathering an immense amount of visual information and displaying it to human operators. However, it can take a great deal of time and manpower to interpret the information gathered by UAVs. In many cases, the information gathered by UAVs is misinterpreted by human operators and analysts who have a limited time window in which to interpret the information.

Video conferencing is generally known in the art. Multiple parties can communicate with each other through video and audio in a video conference. Conventional video conference facilitating technologies typically require a fixed camera placed in a place where each party is located during the video conference. For video output, the view of other parties on a screen at one party's location is often limited due to the camera placements and field of view at the other parties' location. Moreover, typically only one camera is used to capture a view at a party's location during the video conference, and thus the field of view of that party can be limited to the size of that camera's field of view. This presents a challenge particularly when the party has presenters during the video conference scattering around across a room. The conventional video conference technologies typically cannot capture presenters scattering around at one location at once.

SUMMARY

Embodiments are provided for facilitating a wide-view video conference through a UAV network. For facilitating the wide-view video conference, UAVs, for example drones can be employed to capture and transmit video data at locations of parties involved in the wide-view video conference. For capturing video data of a location where a party of the video conference is located, one or more UAVs in the UAV network can be instructed to locate the party's location and zoom-in onto the party's location. In some implementations, the UAV(s) may be instructed to move close to the party's location and find an angel so that a clear view of the party's location can be captured. The UAV(s) can be equipped with one or more video cameras. In some examples, the UAV(s) can be equipped with a 360 degree video camera such that a wide-area covered by the 360 degree video can be captured. In some examples, the individual UAV(s) may simply carries a camera either fixed on the UAV at a certain angle with respect to the UAV or may be rotated around.

Once video data is captured by a given UAV zoomed-in onto a given party's location, the video data can be transmitted to a video data processing center in real-time or substantially in real-time. The video data transmission by the given UAV to the video data processing center can be through a UAV network. For example, the video data can be first transmitted to a controller that controls the given UAV, and from that controller, the video data can be relayed to the video processing center via a wired or wireless network. As mentioned above, the video data transmitted to the video processing center can include a wide field of view of the location of the party zoomed-in onto by the given UAV. In some implementations, the video processing center can be configured to process the wide-view video data received from the given UAV for presentation onto a display. In some implementations, the video conference center can be configured to provide capability to host the video conference and to route video data the parties in the video conference.

For outputting a video stream at a location of a given party in the video conference, a display may be equipped with a network connection. For example, the display can receive video data from the video processing center through the network connection. In some implementations, the display may be operatively connected to a computing device and the computing device may be configured to receive the video data from video processing center through the network connection.

In one embodiment, at least one party of the video conference is located in a transportation apparatus, such as a car. The transportation apparatus may have at least one cabin. In that embodiment, the transportation apparatus is equipped with a wide-view display such as a dashboard covered by a LCD screen. In that embodiment, one or more UAVs can be instructed to zoom-in onto the transportation apparatus to capture a wide view of the cabin. In that embodiment, the other party or other parties in the video conference may include another transportation apparatus. In this way, a wide-view video conference between moving transportation apparatus can be established.

Other objects and advantages of the invention will be apparent to those skilled in the art based on the following drawings and detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention.

No attempt is made to show structural details of the invention in more detail than may be necessary for a fundamental understanding of the invention and various ways in which it may be practiced.

FIG. 4 illustrates another example of a communication protocol that can be used to communicate information to a given vehicle via a UAV and a processing station shown in FIG. 1.

Figure 1:
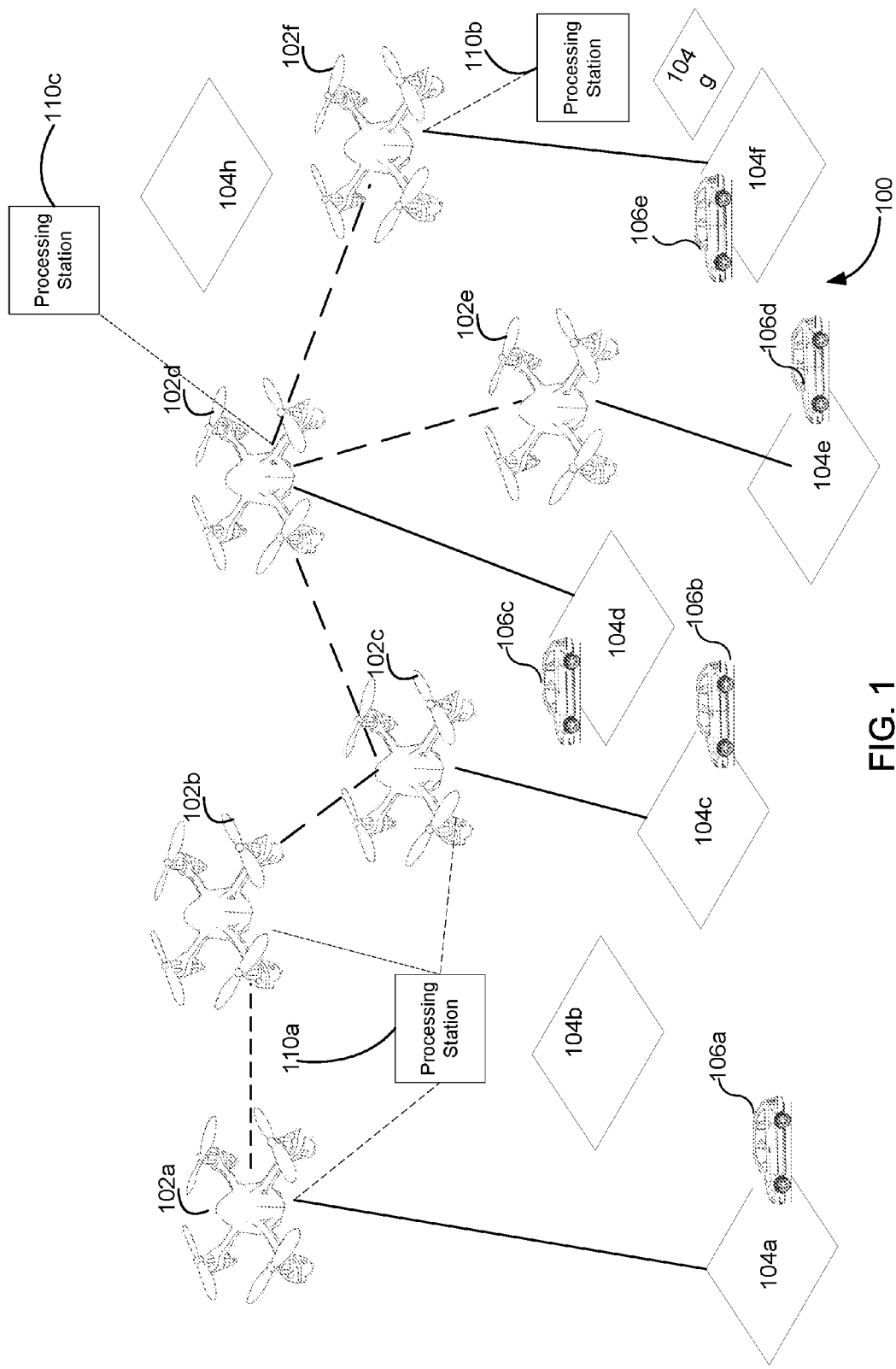
FIG. 1 illustrates an exemplary UAV network in accordance with the disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Various specific embodiments of the present disclosure will be described below with reference to the accompanying drawings constituting a part of this specification. It should be understood that, although structural parts and components of various examples of the present disclosure are described by using terms expressing directions, e.g., "front", "back", "upper", "lower", "left", "right" and the like in the present disclosure, these terms are merely used for the purpose of convenient description and are determined on the basis of exemplary directions displayed in the accompanying drawings. Since the embodiments disclosed by the present disclosure may be set according to different directions, these terms expressing directions are merely used for describing rather than limiting. Under possible conditions, identical or similar reference numbers used in the present disclosure indicate identical components.

UAVs are well suited for applications where the payload consists of optical image sensors such as cameras with powerful lightweight sensors suited for a variety of commercial applications such as surveillance, video conferencing, vehicle positioning, and/or any other applications. A UAV in accordance with the disclosure can collect multi-spectral imagery of any object in an area covered the UAV. In certain embodiments, the UAV in accordance with the disclosure can fly up to 65,000 feet and can cover as much as 500 km in range. One motivation of the present disclosure is to employ UAVs to facilitate video-conferencing involving at least one transportation apparatus, such as an automobile, a bus, or a train. One or more UAVs can be employed to capture video images of an interior of the transportation apparatus, such as a cabin of the transportation apparatus. Since UAV can be configured to move at a speed consistent with a speed of the transportation apparatus above the transportation apparatus, video images of the transportation apparatus can be restively simply captured by the UAV when the transportation apparatus moves.

Another advantage of using the UAV to capture video images of a moving transportation apparatus is that the UAV equipped with a wide-view, e.g., 360 degree, camera, can be used to capture wide-view video images of an interior of the transportation apparatus so along as there is clear view of the interior of the transportation apparatus from the UAV. The wide-view video data can be transmitted from the UAV to a video processing center via a ground controller of the UAV network. After being processed by the video processing center, the wide-view video images of the interior of the transportation apparatus can be transmitted to other parties for presentation. In this way, a wide-view video conference can be facilitated. In some implementations, multiple parties of the video conference include two or more transportation apparatus. In those implementations, wide-view video conference between multiple transportation apparatus can be facilitated.

FIG. 1 illustrates an exemplary UAV network 100 for facilitating communications for a vehicle in accordance with the disclosure. As shown, the UAV network 100 can comprise multiple UAVs 102, such as UAVs 102a-f. It should be understood the UAV network 100, in certain embodiments, can comprise hundreds, thousands, or even tens of thousands of UAVs 102. The individual UAVs 102 in UAV network 100, such as UAV 102a, can fly above the ground, between 50,000 to 65,000 feet altitude. However, this is not intended to be limiting. In some examples, some or all of the UAVs 102 in the UAV network 100 can fly at hundreds or thousands feet above the ground. As shown, the individual UAVs 102 in the UAV network 100 can communicate with each other through communication hardware carried by or installed on UAVs 102. For example, the communication hardware onboard a UAV 102 can include an antenna, a high frequency radio transceiver, an optical transceiver, and/or any other communication components for long range communications. A communication channel between any two given UAVs 102 in UAV network 100, for example, UAV 102c and UAV 102d, can be established.

One way of establishing a communication channel between any two given UAVs is to have them autonomously establish the communication channel through the communication hardware onboard the two given UAVs 102. In this example, UAVs 102a, 102b and 102c are neighboring UAVs such that they cover neighboring areas 104a, 104b, and 104c respectively. They can be configured to communicate with each other once they are within a threshold distance. The threshold distance can be the maximum communications range of the transceivers onboard the UAVs 102a, 102b, and 102c. In this way, UAVs 102a, 102b, and 102c can send data to each other without an access point.

Another way of establishing a communication channel between any two given UAVs 102 in UAV network 100 is to have them establish communication channel through a controller. As used herein, a controller may be referred to as a piece of hardware and/or software configured to control communications within UAV network 100. The controller can be provided by a ground processing station, such as ground controller 110a, 110b, or 110c. For instance, the controller can be implemented by a computer server housed in a controller 110. In certain embodiments, the controller can be provided by a UAV 102 in the UAV network 100. For instance, a given UAV 102, such as an unmanned helicopter or a balloon, in the UAV network 100 can carry payloads including one or more of a processor configured to implement the controller. In any case, the controller can be configured to determine network requirements based on an application supported by UAV network 100, and/or to perform any other operations. In implementations, control signals can be transmitted via a control link from the controller to the UAVs 102 shown in FIG. 1.

As mentioned above, an important criteria to a UAV 102 in the network is altitude. However, as the UAV 102 altitude increases, the signals emitted by UAV 102 becomes weaker. A UAV 102 flying at an altitude of 65,000 feet can cover an area up to 100 kilometers on the ground, but the signal loss can be significantly higher than would occur for a terrestrial network. Radio signals typically requires a large amount of power for transmission in long distance. On the other end, the payloads can be carried by a UAV 102 that stays in the air for an extended period of time is limited. As mentioned above, solar energy can be used to power the UAV 102. However this limits the weight of payloads that can be carried by a UAV 102 due to the limited rate at which solar irritation can be absorbed and converted to electricity.

Free-space optical communication (FSO) is an optical communication technology that transmits light in free space to wirelessly transmit data for telecommunications. Commercially available FSO systems use wave length close to visible spectrum around 850 to 1550 nm. In a basis point-to-point FSO system, two FSO transceivers can be placed on both sides of transmission path that has unobstructed line-of-sight between the two FSO transceivers. A variety of light sources can be used for the transmission of data using FSO transceivers. For example, LED and laser can be used to transmit data in a FSO system.

Lasers used in FSO systems provide extremely high bandwidths and capacity, on par with terrestrial fiber optic networks, but they also consume much less power than microwave systems. A FSO unit can be included in the payloads of a UAV 102 for communication. The FSO unit can include an optical transceiver with a laser transmitter and a receiver to provide full duplex bi-directional capability. The FSO unit can use a high-power optical source, i.e., laser, and a lens to transmit the laser beam through the atmosphere to another lens receiving the information embodied in the laser beam. The receiving lens can connect to a high-sensitivity receiver via optical fiber. The FSO unit included in a UAV 102 in accordance with the disclsoure can enable optical transmission at speeds up to 10 Gbps.

Also shown in FIG. 1 are vehicles 106a-f. A given vehicle 106 can be equipped with communication hardware. The communication hardware in the given vehicle 106 can include a FSO unit described above, a radio transceiver, and/or any other type of communication hardware. The communication hardware included in the vehicle 106 can be used to establish a communication channel between the vehicles 106 via the UAVs 102. A controller 110 can include a FSO unit configured to establish a communication channel FSO unit through laser beam. Through the communication channel, UAV 102 can be configured to communicate its geo-locations to controller 110. Since ground controller 110 is stationary, the geo-location of ground controller 110 can be preconfigured into an onboard computer in UAVs 102. Through the ground controller 110, information intended for vehicle 106 can be forwarded to vehicle 106. The ground controller 110 can be connected to a wired or wireless network. Information intended for vehicle 106 can be communicated through the wired or wireless network from or to another entity connected to the wired or wireless network. The information intended for vehicle 106 can be first communicated to the UAV 102 through laser beam, and the UAV 102 can forward the information to vehicle 106 through laser beam 204a.

In implementations, for locating a vehicle 106, a tracking signal can be transmitted from UAV 102 for tracking vehicle 106. The tracking signal can be in various forms. For example, the UAV 102 may scan the covered area 104 with a camera aboard UAV 102 in a predetermined pattern. For example, the UAV 102 may scan the covered area 104 in a scan line fashion from on one corner of the covered area 104 to the opposite corner of the covered area 104. As another example, the UAV 102 may scan the covered area 104 in a concentric sphere fashion starting from an outer sphere within the covered area 104, gradually into inner spheres within the covered area 104 until the center of the covered area 104. Still as another example, the UAV 102 may scan the covered area along predefined lines of areas 104, for example a portion of a road that enters area 104 and another portion of the road that exits area 104. In certain embodiments, the UAV 102 may carry a radio transmitter configured to broadcast in radio signals within the covered area 104. In those examples, the broadcast radio signals can serve as tracking signals such that once they are intercepted by a vehicle 106 passing through the covered area 104, the UAV 102 can be configured to location a position of the vehicle 106 within the covered area 104.

An identification of the vehicle 106 can be captured after the vehicle 106 has been tracked by UAV 102. In certain implementations, the identification of the vehicle 106 can be captured by a camera carried by the UAV 102. For example, the UAV 102 may be configured to capture a picture of a license plate of vehicle 106 once it has been tracked. As another example, the UAV 102 may be configured to transmit a request to vehicle 106 to inquire about its identification, and the vehicle 106 can send its identification to the UAV 102 in response to the request.

Any one of the UAVs 102 shown in FIG. 1 may be instructed to "monitor" or "zoom-in onto" a corresponding vehicle 106. For example, the UAV 102a may receive location information regarding vehicle 106a and instructions to zoom-in onto vehicle 106a. In that example, in response to receiving such location information and instructions, the UAV 102a may be configured to track vehicle 106a based on the received location information. The may involve moving the UAV 102a into a vicinity of vehicle 106a such that UAV 102a has a clear view of vehicle 106. As will be discussed below, the instructions received by UAV 102a may include capturing video images of interior of vehicle 106a. For achieving this, UAV 102a may be equipped with one or more cameras. In some embodiments, the camera(s) carried by UAV 102a may include a wide-view camera capable of capturing a wide field of view. In one embodiment, the wide-view camera carried by UAV 102a is an omnidirectional camera with a 360-degree field of view in a horizontal plane, or with a visual field that covers (approximately) the entire sphere.

In some embodiment, the cameras carried by UAV 102a may include multiple cameras fixed at corresponding locations on an underbody of UAV 102a. In one embodiment, the multiple cameras may be arranged on the underbody of UAV 102a to form a ring. In one configuration, 8 cameras are used to form such a ring. One or more of those cameras can be employed to capture the interior of vehicle 106a depending on a distance between UAV 102a and vehicle 106a, an angle between the two, and/or any other factors. For example, three cameras in the ring may be employed by UAV 102*a* to capture video images of the interior of vehicle 106*a*. In some implementations, individual cameras carried by UAV 102*a* may have panoramic view capability. For example, various types of panoramic view cameras may be carried by UAV 102*a*, including short rotation, full rotation, fixed lens, and any other types of panoramic view cameras.

Figure 2:
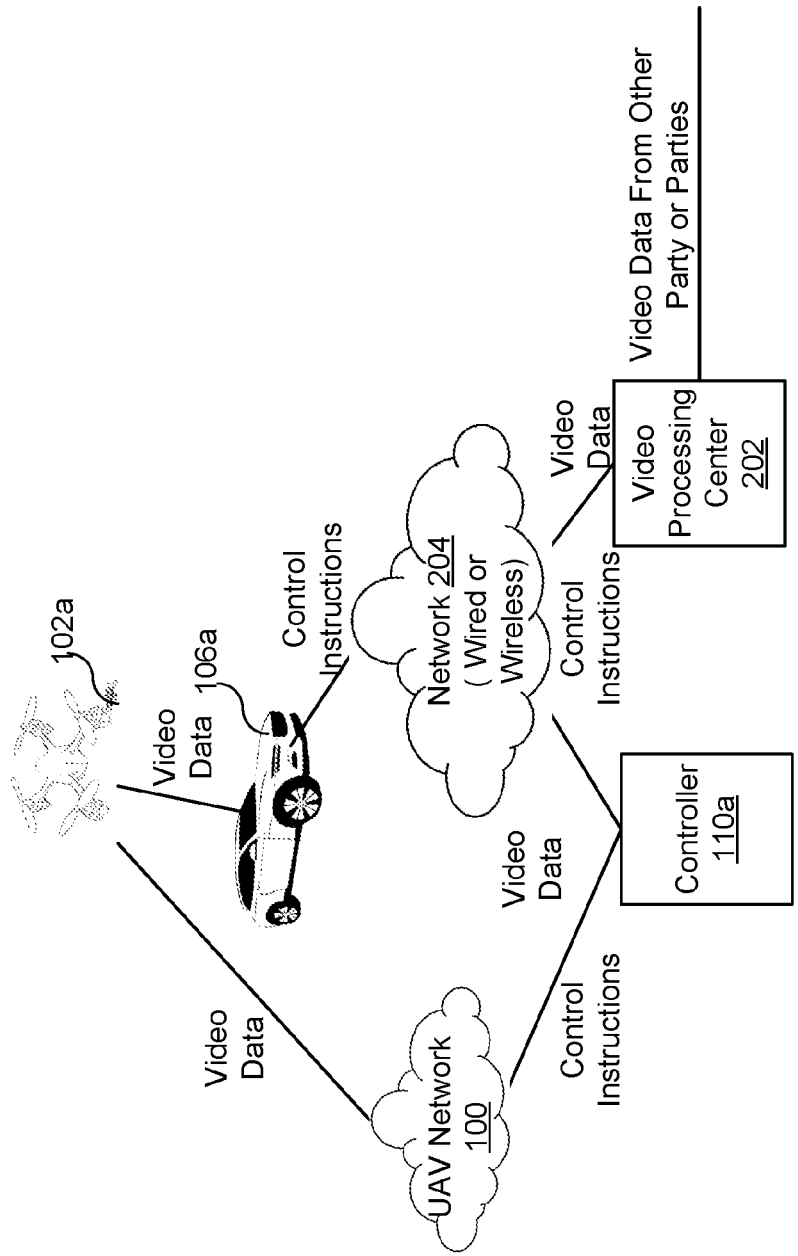
FIG. 2 conceptually illustrates facilitating a wide-view video conference using UAVs in accordance with the disclosure.

With UAV network 100, UAVs 102, vehicle 106 and controller 110*a* having been generally described, attention is now directed to FIG. 2, which conceptually illustrates facilitating a wide-view video conference using UAVs in accordance with the disclosure. As shown, individual UAVs 102 in the UAV network 100 can be instructed to capture video images of interior of a vehicle 102 as described above. In FIG. 2, it is shown that UAV 102*a*, on a request, can be positioned such that it captures video images of the interior of vehicle 106*a*. The video images captured by UAV 102*a* may include wide-view video of the interior of vehicle 106*a*. For example, UAV 102*a* may be configured to capture 360 video of the interior of vehicle 106*a* using one or more 360 degree camera as described above. In implementations, in response to an instruction to capture video images of vehicle 106*a* received, for example from controller 110*a*, UAV 102*a* can be configured to be positioned such that UAV 102*a* has a clear line of sight with respect to vehicle 106*a*. In some implementations, the position of UAV 102*a* with respect to vehicle 106*a* can be adjusted based on the video images of vehicle 106*a* as captured by UAV 102*a*. For instance, when the video images are determined not to show a wide-view of the interior of vehicle 106*a*, the UAV 102*a* can be instructed to reposition itself until acceptable quality of wide-view video images of the interior of vehicle 106*a* are received. This may involve instructing the UAV 102*a* to adjust its angle, distance, speed, and/or any other aspects with respect to vehicle 106*a*.

As also shown, UAV 102*a* can be configured to transmit video data to a corresponding controller 110*a* via UAV network in a communication way described above. For example, the video data may be first transmitted to another UAV 102 in proximity to UAV 102*a*. For instance, that UAV 102 may have more computing power or capability than UAV 102*a*, which may be a lightweight UAV configured to follow moving vehicles and to capture video images of interiors of the moving vehicles. In that example, the UAV with more computing power can be used as a relay station to relay video data from UAV 102*a* to controller 110*a* for further processing of the video data.

The controller 110*a* may be configured to 1) communicate control instructions with the video processing center 202 and with the UAV 102*a*; 2) receive video data from UAV 102*a*; 3) transmit the video data from the UAV 102*a* to the video processing center 202; and/or to perform any other operations. The communications between the controller 110*a* and video processing center 202 may follow a video conferencing protocol, such as the H.323 protocol. H.323 is well understood in the art, and details of this protocol will not be repeated herein. In short, the controller 110*a* may server as an interface between UAV 102*a* and video processing center 202 for facilitating the wide-view video conferencing in accordance with the disclosure. In implementations, the communications between the controller 110*a* and video processing center 202 may include receiving video conferencing instructions from the video processing center 202, transmitting video data captured by UAV 102*a* to video processing center 202, transmitting video conferencing data to the video processing center 202. For example, controller 110*a* may be configured to receive instructions from video processing center 202 indicating a video conferencing call is to be initiated with a specific vehicle, such as vehicle 106*a*. In that example, the controller 110*a* can be configured to generate an instruction to instruct a corresponding UAV, such as UAV 102*a* to locate vehicle 106*a* and to capture video images of vehicle 102*a* to facilitate the video conference requested by video processing center 202. Once a video conferencing connection is established between UAV 102*a* and video processing center 202 via the controller 110*a*, the controller 110*a* can transmit the video data received from UAV 102*a* to the video processing center 202. In some implementations, the controller 110*a* can also be configured to transmit conference data such as data loss indications, data packets received so far, synchronization messages, and/or any other video conferencing data to the video processing center 202 to facilitate the wide-view video conferencing.

The video processing center 202 can be configured to 1) host a wide-view video conference in accordance with the disclosure; 2) communicate video conference instructions to controller 110*a*; 3) receive video data from controller 110*a*; 4) process video data from controller 110*a* to facilitate a wide-view video conference; 5) communicate control instructions with controller 110*a*; 6) transmit process video data to other party or parties in the video conference hosted by the video conference center 202; and/or to perform any other operations. Hosting a wide-view video conference by the video processing center 202 may include receiving a request from a party to establish a wide-view video conference with one or more other parties. For example, the video processing center 202 can be configured to receive a request from a vehicle 106*a* to establish a wide-view video conference with another vehicle 106. Such a request may be received by video processing center 202 via network 204, which may include a wired and/or a wireless network. For instance, network 204 can include the Internet. In that example, vehicle 106*a* may be configured to make a video conference call to video processing center 202 via network 204. In response to receiving such a request, the video processing center 202 may be configured to initiate a wide-view video conference by generating control instructions on its own. For example, the control instructions generated by video processing center 202 can include instructing a controller 110*a* corresponding to the other vehicle 106 as requested by 102*a* to capture video images of the other vehicle 106. In another example, video processing center 202 can be configured to receive a request from a computing device to initiate a wide-view video conference call with the vehicle 106*a*. For instance, such a request may be received from a video conference device in an office building, where the wide-view video conference request is made by a party of one or more people located in an office in the office building. In that example, the video processing center 202 may generate control instructions to controller 110*a* to have it generate control instructions to capture wide-view video images of the interior of the vehicle 106*a*.

In any case, video processing center 202 can be configured to communicate control instructions with controller 110*a* via network 204. The control instructions may include instructions transmitted by video processing center 202 to request the controller 110*a* to generate instructions to capture wide-view video images of the interior of vehicle 106*a*. The control instructions may include instructions transmitted by controller 110 to indicating various status of video image capturing for vehicle 106*a*, such as data packets received so far, data packets lost so far, and/or any other control instructions to facilitate video processing center 202 to process and/or synchronize video data from controller 110a. In some implementations, the control instructions may include instructions transmitted by video processing center 202 requesting the controller 110 to terminate wide-view video image capturing of vehicle 106a. In some implementations, the control instructions may include instructions transmitted by video processing center 202 indicating various statistics regarding video processing center 202. For example, the video processing center 202 may be configured to transmit control instructions to controller 110 indicating its throughput rate, its current CPU load, its current threads available and/or any other statistics to assist the controller 110 to determine a quality of wide-view video images that should be captured by UAV 102a.

As mentioned above, video processing center 202 can be configured to process video data received from controller 110. The video processing by video processing center 202 may include synthesizing the video data to generate a wide-view of the interior of vehicle 102a. For example, as described above, in some embodiments, the UAV 102a may be equipped with multiple cameras configured to capture a subject from different angles. In those embodiments, the video data received from controller 110 can include video images captured by those cameras in separate channels. For instance, a first camera of UAV 102a can be configured to capture the interior of vehicle 106a from a first angle; a second camera of UAV 102a can be configured to capture the interior of vehicle 106a from a second angle, and so on. The video data received from controller 110 may be in a form such that the video images of the interior of the vehicle 106a as captured by the first camera is in a first channel, video images of the interior of the vehicle 106a as captured by the second camera is in a second channel, and so on. In those embodiments, the video processing center 202 may be configured to assemble the video images transmitted in the different channels to form wide-view video images of the vehicle 106a.

In some implementations, the video processing by the video processing center 202 can include synchronizing the video data received from controller 110. Since the UAV network 110 and/or network 204 may be "best effort" network, video data transmitted through those networks may be out of sequence when they are received video processing center 202. In those embodiments, the video processing center 202 may be configured to process the video data received from controller 110 to ensure the packets received from controller are in sequence. In some examples, certain video packets may be lost along the way when transmitted to video processing center 202. In those examples, the video processing center 202 may be configured to instruct controller 110 to retransmit the lost video packets. In some implementations, video processing center 202 may be configured to assemble video feeds for different parties in the wide-view video conference to form a combined view of those parties. For example, when the wide-view video conference includes more than two parties, the video processing center 202 may be configured to combine feeds from two of those parties for transmission to a given party in the wide-view video conference. In some implementations, video processing center 202 may be configured to combine video data received from controller 110 with audio data. For instance, the video processing center 202 can be configured to receive audio data for vehicle 106a from network 204. For instance, the audio portion of the wide-view conference can be captured using a recording device such as microphone placed within vehicle 106a, and the captured audio data can be transmitted to video processing center 202 via the network 204. In that example, after receiving the audio data from vehicle 106a, the video processing center 202 can be configured to synchronize the video and audio data for transmission to one or more other parties in the wide-view conference.

As also mentioned above, the video processing center 202 may be configured to output video images of wide-view video images of one or more parties to a given party in the wide-video conference hosted by the processing center 202. For example, one party in the wide-view video conference may be vehicle 106a, a second party in the wide-view video conference may be another vehicle, such as vehicle 106b, a third party in the wide-view video conference may be one or more people in an office located in a building using a video conferencing device, and/or any other party or parties. In that example, the video processing center 202 may be configured to combine feeds from the second party and the third party to form wide-view video images of those parties and transmit the combined video images to vehicle 106a via network 204. Vehicle 102a may be equipped with one or more wide-view displays for outputting the wide-view video images received from the video processing center 202. For example, in one implementation, the vehicle 106a may be equipped with a dashboard covered by a LCD screen. In that example, the video images for the second and third parties as received from the video processing center 202 can be output the dashboard LCD screen to facilitate person or people within vehicle 106a to have the wide-view conference with the second and third parties. Similarly, video processing center 202 may be configured to combine the wide-view video data from UAV 102a and the video feed from second party for output to the video conferencing device in the office. For example, the video conferencing device may include a panoramic display with a wide screen.

Figure 3:
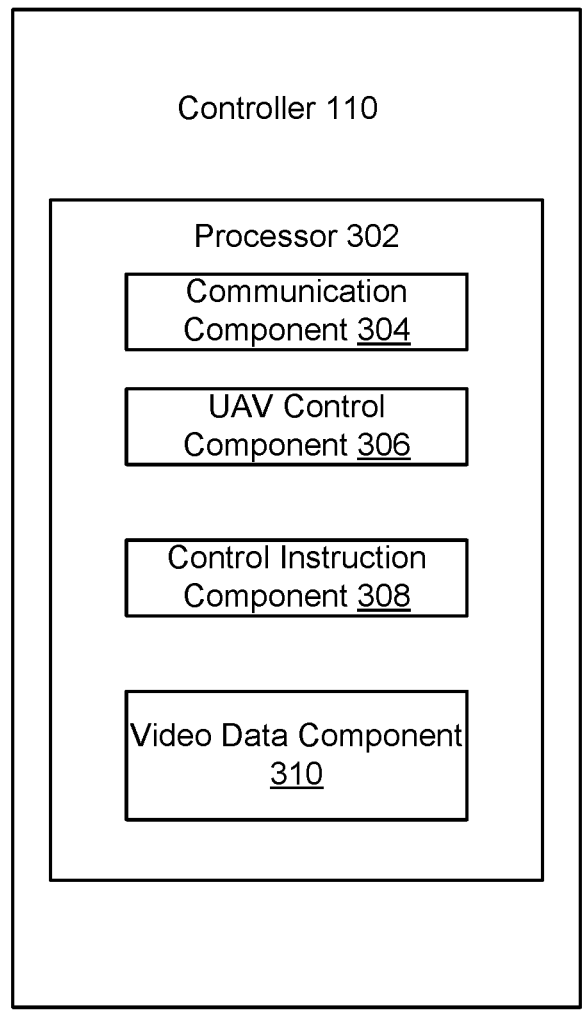
FIG. 3, illustrates an example of a controller shown in FIG. 1.

Attention is now directed to FIG. 3, where an example of controller 110 is shown. As shown, the controller 110 may include one or more of a processor 302 configured to execute program components. The program components may include a communication component 304, a UAV control component 306, a control instruction component 308, a video data component 310, and/or any other components. The communication component 304 can be configured to communicate with a video processing center, such as video processing center 202 shown in FIG. 2. In some implementations, the communications between the controller 110 and video processing center 202 may follow a video conferencing protocol, such as the H.323 protocol. In those implementations, the communication component 304 may be configured with H.323 protocol stack to perform communication with video processing center 202 accordingly. The communication between the controller 110 and video processing center 202 may include a request from the video processing center 202. The request may indicate that a wide-view video conference involving a vehicle, such as vehicle 106a is being facilitated by video processing center 202 and the controller 110 is requested to capture wide-view video images of the interior of the vehicle 106a.

The UAV control component 306 can be configured to locate a vehicle as requested in the request for a wide-view video conference. For example, after receiving the request from video processing center 202 for a wide-view video conference involving vehicle 106a, the UAV control component 306 can be configured to identify whereabouts about the vehicle 106a. In some implementations, the UAV control component 306 may be configured to obtain locations regarding the vehicle 106 after the vehicle 106a is requested, for example in the wide-view video conference request from the video processing center 202. For instance, GPS information regarding the locations of vehicle 106*a* may be periodically transmitted to controller 110 or may be stored in a location database operatively connected controller 110. As another example, locations of vehicle 106 may be identified through UAV network. For instance, UAV control component 306 may be configured to send a broadcast message to one or more UAVs within proximity of controller 110 for locating UAV 106*a*. The UAV control component 306 may be configured to receive location information regarding vehicle 106*a* from a given UAV, such as UAV 102*a* after the broadcast message having been sent.

The control instruction component 308 can be configured to generate a control instruction. The control instruction generated by control instruction component 308 can include an instruction instructing a UAV, such as UAV 102*a*, to capture wide-view video images of the interior of a vehicle, such as vehicle 106*a*. The control instruction generated by control instruction component 308 can include an instruction indicating a status of the video capturing of the interior of vehicle 106*a* to the video processing center 202. Such a control instruction can be transmitted to the video processing center 202 to assist the processing by the video processing center 202.

The video data component 310 can be configured to receive video data from a UAV and transmit the received data to a video processing center 202 for further processing of the received video data. The video data component 310 can be configured to receive the video data from the UAV, such as UAV 102*a* via the UAV network 100. After receiving the video data from UAV 102*a*, the video data component 310 can be configured to transmit the received video data simultaneously or substantially simultaneously to the video processing center 202 for further processing.

Figure 4:
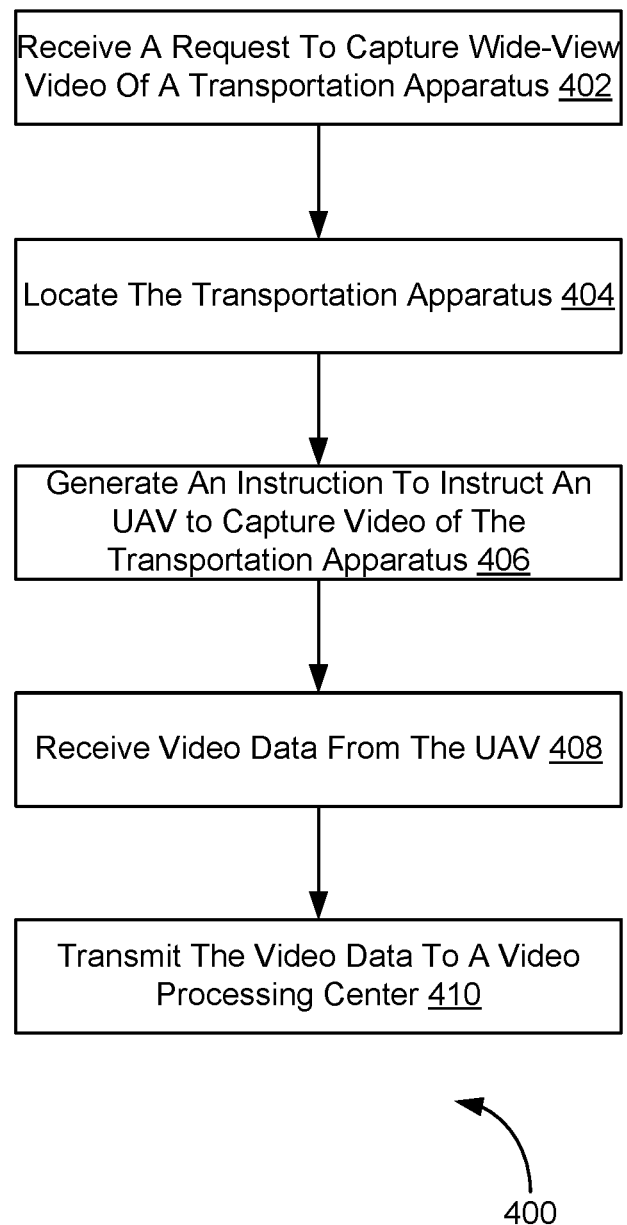
FIG. 4 illustrates an exemplary method for instructing a UAV to capture an interior of a vehicle is illustrated.

Attention is now is directed to FIG. 4 where an exemplary method for instructing a UAV to capture an interior of a vehicle is illustrated. The particular series of processing steps depicted in FIG. 4 is not intended to be limiting. It is appreciated that the processing steps may be performed in an order different from that depicted in FIG. 4 and that not all the steps depicted in FIG. 4 need be performed. In certain implementations, the method 400 may be implemented by a controller in a UAV network, such as the controller shown in FIG. 3.

In some embodiments, the method depicted in method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At 402, a request to capture wide-view video of a transportation apparatus is received. In some implementations, operations involved in 402 can be implemented by a communication component the same as or substantially similar to the communication component 304 illustrated and described herein.

At 404, the transportation apparatus can be located through UAV. Operations involved in 404 may include generating an instruction to instruct the UAV to locate the transportation apparatus, such as the vehicle 106*a*. In some implementations, operations involved in 404 can be implemented by a communication component the same as or substantially similar to the communication component 304 illustrated and described herein.

At 406, an instruction instructing the UAV to capture wide-view video images of the interior of the transportation apparatus is generated. In some implementations, operations involved in 406 can be implemented by a control instruction component the same as or substantially similar to the control instruction component 308 illustrated and described herein.

At 408, video data can be received from the UAV. In some implementations, operations involved in 408 can be implemented by a video data component the same as or substantially similar to the video data component 310 illustrated and described herein.

At 410, the video data received at 408 can be transmitted to a video processing center for further processing. In some implementations, operations involved in 410 can be implemented by a video data component the same as or substantially similar to the video data component 310 illustrated and described herein.

Figure 5:
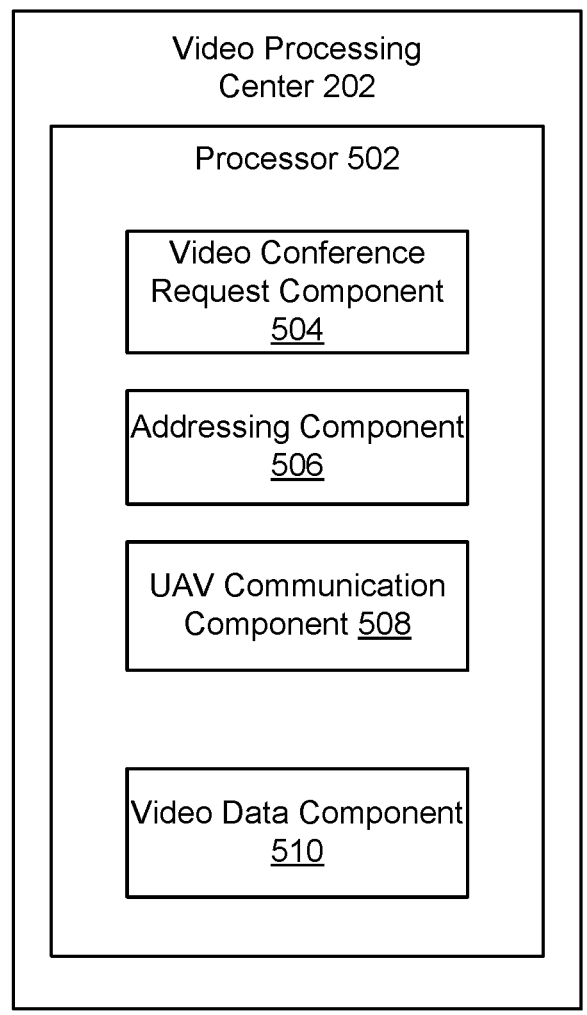
FIG. 5 illustrates an example of a video processing center shown in FIG. 2.

Attention is now directed to FIG. 5, where an example of video processing center 202 is shown. As shown, the video processing center 202 may include one or more of a processor 502 configured to execute program components. The program components may include a video conference request component 504, an addressing component 506, a UAV communication component 508, a video component 510 and/or any other components. The video conference component 504 can be configured to receive a request for initiating a wide-view video conference. This may include receiving the request from a party to establish a wide-view video conference with one or more other parties. For example, the video conference component 504 can be configured to receive the request from a vehicle 106*a* to establish a wide-view video conference with another vehicle 106. Such a request may be received by video conference component 504 via network 204, which may include a wired and/or a wireless network. For instance, network 204 can include the Internet. In that example, vehicle 106*a* may be configured to make a video conference call to video conference component 504 via network 204.

The addressing component 506 can be configured to identify an address of a party involved in the video conference as indicated in the request received by video conference component 504. This may include identifying a reachable address of the party. For example, when the party is a vehicle, the addressing component 506 can be configured to identify which controller 110 may be responsible for controlling communications with and/or video capturing of the vehicle. As another example, when the party is a landline conference device, the address component 506 can be configured to determine an internet address of the landline conference device. In implementations, the addressing component 506 can be configured to communicate with a directory server for determine or identify a reachable address of the party.

The UAV communication component 508 can be configured to communicate with a UAV controller via a network, such as the network 204. Communication by UAV communication component 508 with the UAV controller can include communicating control instructions generated by the video processing center 202 to UAV controller. For example, in response to receiving a request to initiate a wide-view video conference as described, the video processing center 202 may be configured to initiate a wide-view video conference by generating control instructions on its own. For example, the control instructions generated by video processing center 202 can include instructing a controller 110a corresponding to the other vehicle 106 to capture video images of the other vehicle 106. Such control instructions can be communicated to the controller 110 by the communication component 508 via the network 204. In some implementations, the control instructions may include instructions requesting the controller 110a to terminate wide-view video image capturing of vehicle 106a. In some implementations, the control instructions may include instructions transmitted by video processing center 202 indicating various statistics regarding video processing center 202. For example, the video processing center 202 may be configured to transmit control instructions to controller 110 indicating its throughput rate, its current CPU load, its current threads available and/or any other statistics to assist the controller 110 to determine a quality of wide-view video images that should be captured by UAV 102a.

The video data component 510 can be configured to process video data received from a UAV controller. The video processing by video data component 510 may include synthesizing the video data to generate a wide-view of the interior of a transportation apparatus. For example, as described above, in some embodiments, a UAV may be equipped with multiple cameras configured to capture a subject from different angles. In those embodiments, the video data received from controller 110a can include video images captured by those cameras in separate channels. For instance, a first camera of UAV 102a can be configured to capture the interior of vehicle 106a from a first angle; a second camera of UAV 102a can be configured to capture the interior of vehicle 106a from a second angle, and so on. The video data received from controller 110a may be in a form such that the video images of the interior of the vehicle 106a as captured by the first camera is in a first channel, video images of the interior of the vehicle 106a as captured by the second camera is in a second channel, and so on. In those embodiments, the video data component 506 may be configured to assemble the video images transmitted in the different channels to form wide-view video images of the vehicle 106a.

In some implementations, the video processing by the video data component 510 can include synchronizing the video data received from controller 110. Since the UAV network 110 and/or network 204 may be "best effort" network, video data transmitted through those networks may be out of sequence when they are received video data component 510. In those embodiments, the video data component 510 may be configured to process the video data received from controller 110a to ensure the packets received from controller are in sequence. In some examples, certain video packets may be lost along the way when transmitted to video data component 510. In those examples, the video data component 510 may be configured to instruct controller 110a to retransmit the lost video packets. In some implementations, video data component 510 may be configured to assemble video feeds for different parties in the wide-view video conference to form a combined view of those parties. For example, when the wide-view video conference includes more than two parties, the video data component 510 may be configured to combine feeds from two of those parties for transmission to a given party in the wide-view video conference. In some implementations, video data component 510 may be configured to combine video data received from controller 110 with audio data. For instance, the video data component 510 can be configured to receive audio data for vehicle 106a from network 204. For instance, the audio portion of the wide-view conference can be captured using a recording device such as microphone placed within vehicle 106a, and the captured audio data can be transmitted to video data component 510 via the network 204. In that example, after receiving the audio data from vehicle 106a, the video data component 510 can be configured to synchronize the video and audio data for transmission to one or more other parties in the wide-view conference.

Figure 6:
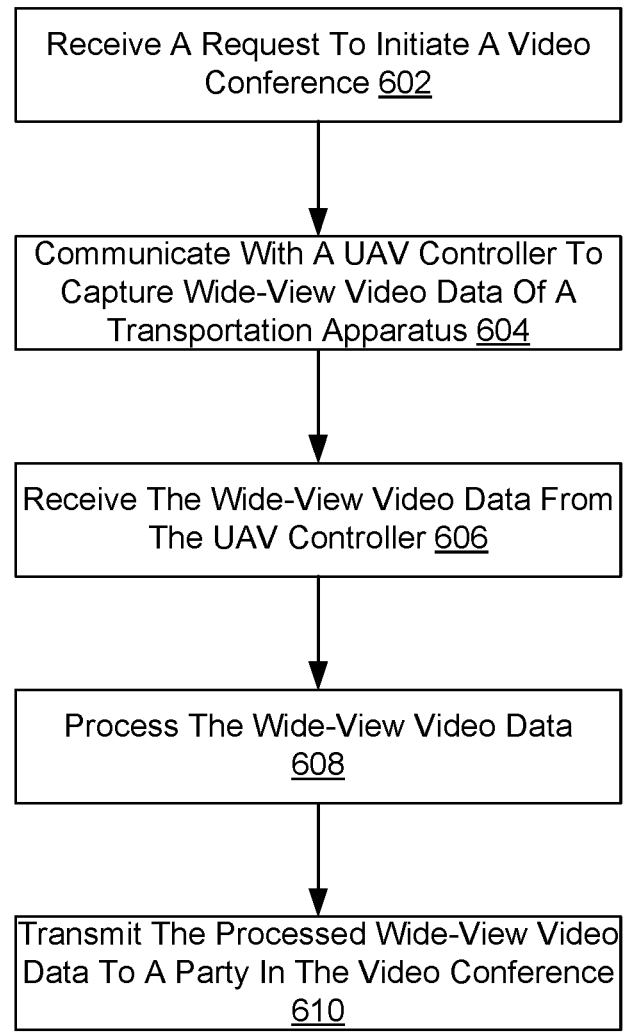
FIG. 6 illustrates an exemplary method for hosting a wide-view video conference.

Attention is now is directed to FIG. 6 where an exemplary method for hosting a wide-view video conference. The particular series of processing steps depicted in FIG. 6 is not intended to be limiting. It is appreciated that the processing steps may be performed in an order different from that depicted in FIG. 6 and that not all the steps depicted in FIG. 6 need be performed. In certain implementations, the method 600 may be implemented by a video processing center, such as the video processing center shown in FIG. 5.

In some embodiments, the method depicted in method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At 602, a request to initiate a wide-view video conference involving a transportation apparatus is received. In some implementations, operations involved in 602 can be implemented by a video conference request component the same as or substantially similar to the video conference request component 506 illustrated and described herein.

At 604, A UAV controller is communicated for capturing wide-view video data of a transportation apparatus. In some implementations, operations involved in 604 can be implemented by a UAV communication component the same as or substantially similar to the UAV communication component 508 illustrated and described herein.

At 606, wide-view video data from the UAV controller can be received. In some implementations, operations involved in 606 can be implemented by a UAV communication component the same as or substantially similar to the UAV communication component 508 illustrated and described herein.

At 608, video data received at 606 can be processed. In some implementations, operations involved in 608 can be implemented by a video data component the same as or substantially similar to the video data component 510 illustrated and described herein.

At 610, the video data processed at 608 can be transmitted to a party of the wide-view video conference for presentation. In some implementations, operations involved in 610 can be implemented by a video data component the same as or substantially similar to the video data component 510 illustrated and described herein.

Figure 7:
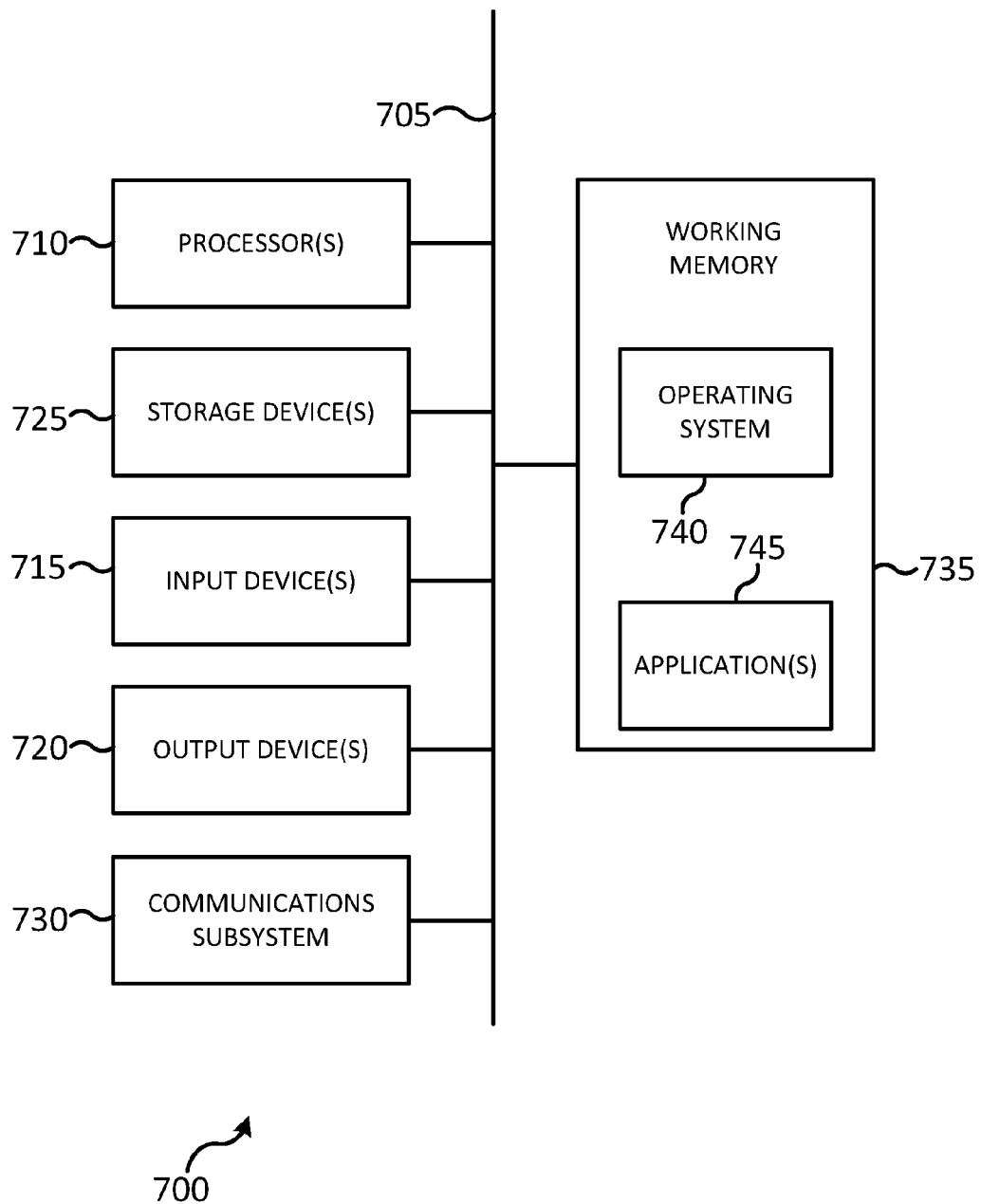
FIG. 7 illustrates a simplified computer system, according to an exemplary embodiment of the present disclosure.

FIG. 7 illustrates a simplified computer system that can be used implement various embodiments described and illustrated herein. A computer system 700 as illustrated in FIG. 7 may be incorporated into devices such as a portable electronic device, mobile phone, or other device as described herein. FIG. 7 provides a schematic illustration of one embodiment of a computer system 700 that can perform some or all of the steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include without limitation a mouse, a keyboard, a camera, and/or the like; and one or more output devices 720, which can include without limitation a display device, a printer, and/or the like.

The computer system 700 may further include and/or be in communication with one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset such as a Bluetooth™ device, an 702.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 730. In other embodiments, a portable electronic device, e.g. the first electronic device, may be incorporated into the computer system 700, e.g., an electronic device as an input device 715. In some embodiments, the computer system 700 will further comprise a working memory 735, which can include a RAM or ROM device, as described above.

The computer system 700 also can include software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 7, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the procedures of such methods are performed by the computer system 700 in response to processor 710 executing one or more sequences of one or more instructions, which might be incorporated into the operating system 740 and/or other code, such as an application program 745, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for facilitating a wide-view video conference via an unmanned aerial vehicle (UAV) network, the method being implemented in one or more of a processor configured to execute programmed components, the method comprising:
    receiving, from a computing device, a request to initiate a wide-view conference involving a first transportation apparatus and a second transportation apparatus;
    communicating with a first UAV controller to capture a wide-view video of the first transportation apparatus in response to receiving the request;
    communicating with a second UAV controller to capture a wide-view video of the second transportation apparatus in response to receiving the request;
    receiving the wide-view video from the first and second UAV controllers;
    processing the wide-view video data by combining the wide-view video from the first and second UAV controllers; and
    transmitting the combined wide-view data to the computing device for presentation.

2. The method of claim 1, wherein the first or the second transportation apparatus includes a vehicle.

3. The method of claim 1, wherein the wide-view video of the first or the second transportation apparatus include video images of an interior of the first or the second transportation apparatus.

4. The method of claim 1, further generating a control instruction to instruct the first UAV controller to terminate the video capturing of the first transportation apparatus and transmitting the control instruction to the first UAV controller.

5. The method of claim 1, wherein the request is received from the computing device via the wireless and/or wired network.

6. The method of claim 1, wherein the wide-view video data from the first and second UAV controllers includes different channels and combining the wide-view video data includes combining the different channels.

7. The method of claim 1, further comprising generating a message indicating a status of the video processing and transmitting the message to the first or the second UAV controller via a wired and/or a wireless network.

8. The method of claim 1, further comprising generating an instruction to instruct the first or the second UAV controller to improve a quality of the wide-view video of the first or the second transportation apparatus.

* * * * *